US012798995B2

(12) United States Patent
Bergner et al.

(10) Patent No.: US 12,798,995 B2
(45) **Date of Patent: *Nov. 17, 2026**

(54) PROCESS FOR MAKING A PARTICULATE (OXY)HYDROXIDE

(71) Applicant: BASF SE, Ludwigshafen Am Rhein (DE)

(72) Inventors: Benjamin Johannes Herbert Bergner, Ludwigshafen (DE); Rafael Benjamin Berk, Ludwigshafen (DE); Lennart Karl Bernhard Garve, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 698 days.

This patent is subject to a terminal disclaimer.

(21) Appl. No.: 18/261,535

(22) PCT Filed: Jan. 7, 2022

(86) PCT No.: PCT/EP2022/050224

§ 371 (c)(1),
(2) Date: Jul. 14, 2023

(87) PCT Pub. No.: WO2022/157014

PCT Pub. Date: Jul. 28, 2022

(65) Prior Publication Data

US 2024/0132370 A1 Apr. 25, 2024

(30) Foreign Application Priority Data

Jan. 20, 2021 (EP) .................................... 21152621

(51) Int. Cl.
*C01G 53/84* (2025.01)
*H01M 4/505* (2010.01)
*H01M 4/525* (2010.01)

(52) U.S. Cl.
CPC .......... *C01G 53/84* (2025.01); *C01P 2002/01* (2013.01); *C01P 2004/04* (2013.01); *C01P 2006/40* (2013.01); *H01M 4/505* (2013.01)

(58) Field of Classification Search
None
See application file for complete search history.

(56) References Cited

U.S. PATENT DOCUMENTS

| | | | | |
|---|---|---|---|---|
| 2019/0020022 | A1* | 1/2019 | Jeong | C01G 53/502 |
| 2019/0326596 | A1 | 10/2019 | Yun et al. | |
| 2021/0098776 | A1 | 4/2021 | Kageura et al. | |

FOREIGN PATENT DOCUMENTS

| | | | |
|---|---|---|---|
| CN | 106252648 | A | 12/2016 |
| JP | 2001106534 | A | 4/2001 |
| JP | 2014510004 | A | 4/2014 |
| JP | 2020155404 | A | 9/2020 |
| WO | 2017/029166 | A1 | 2/2017 |
| WO | 2020207901 | A1 | 10/2020 |
| WO | 2021083686 | A1 | 5/2021 |

OTHER PUBLICATIONS

European Search Report for EP Patent Application No. 21152621.5, Issued on Jul. 28, 2021, 3 pages.
Fey, et al., "Carboxylic acid-assisted solid-state synthesis of LifePO4/C composites and their electrochemical properties as cathode materials for lithium-ion batteries", Journal of Solid State Electrochemistry, vol. 12, Feb. 6, 2008, pp. 825-833.
Wu, et al., "Amino acid-assisted synthesis of Fe2O3/nitrogen doped graphene hydrogels as high performance electrode material", Electrochimica Acta, vol. 283, Sep. 1, 2018, pp. 1858-1870.
International Search Report and Written Opinion for corresponding PCT/EP21/50224, mailed Mar. 18, 2022, 9 pages.

* cited by examiner

*Primary Examiner* — Tanisha Diggs
(74) *Attorney, Agent, or Firm* — Armstrong Teasdale LLP

(57) ABSTRACT

Disclosed herein is a process for making a particulate (oxy)hydroxide of TM including the steps of:

(a) providing an aqueous solution (α) containing a water-soluble salt of nickel, one metal selected from cobalt and manganese, a compound of at least one metal selected from Ti, Zr, Mg and Nb, an α- or β-hydroxy carboxylic acid or ascorbic acid or of an amino acid selected from glycine, alanine and serine, or their alkali metal salts, an aqueous solution (β) containing an alkali metal hydroxide and, optionally, an aqueous solution (γ) containing ammonia, (b) combining the solution (α), the solution (β), and, if applicable, the solution (γ) at a pH value between 11.0 and 13.0 in a stirred tank reactor, thereby creating solid particles of a hydroxide containing nickel, said solid particles being slurried.

15 Claims, 2 Drawing Sheets

Figure 1: TEM-EDX elemental mapping of comparative precursor C-pCAM.1
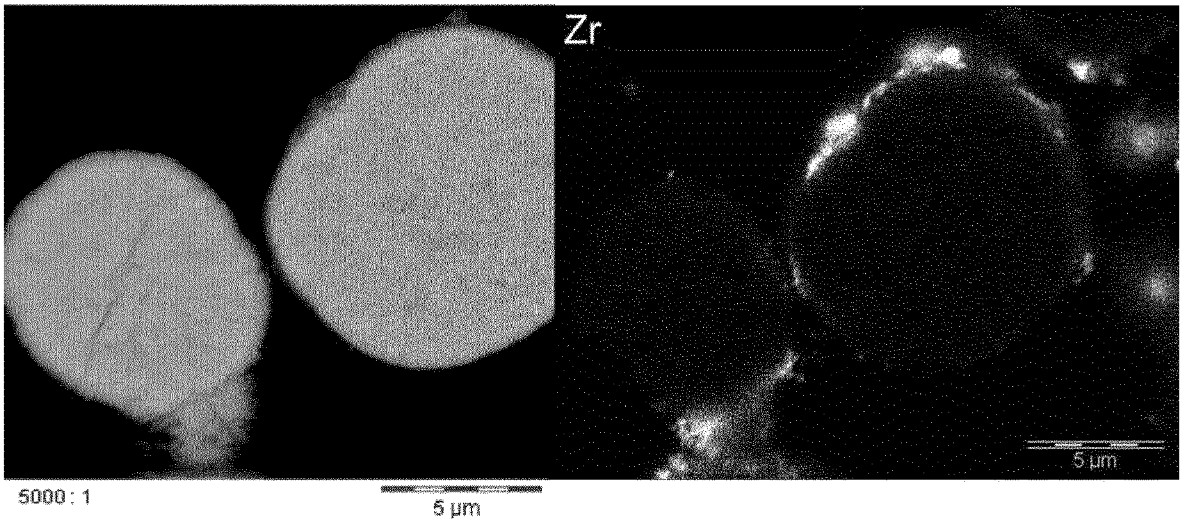
Figure 2: TEM-EDX elemental mapping of inventive precursor pCAM.2
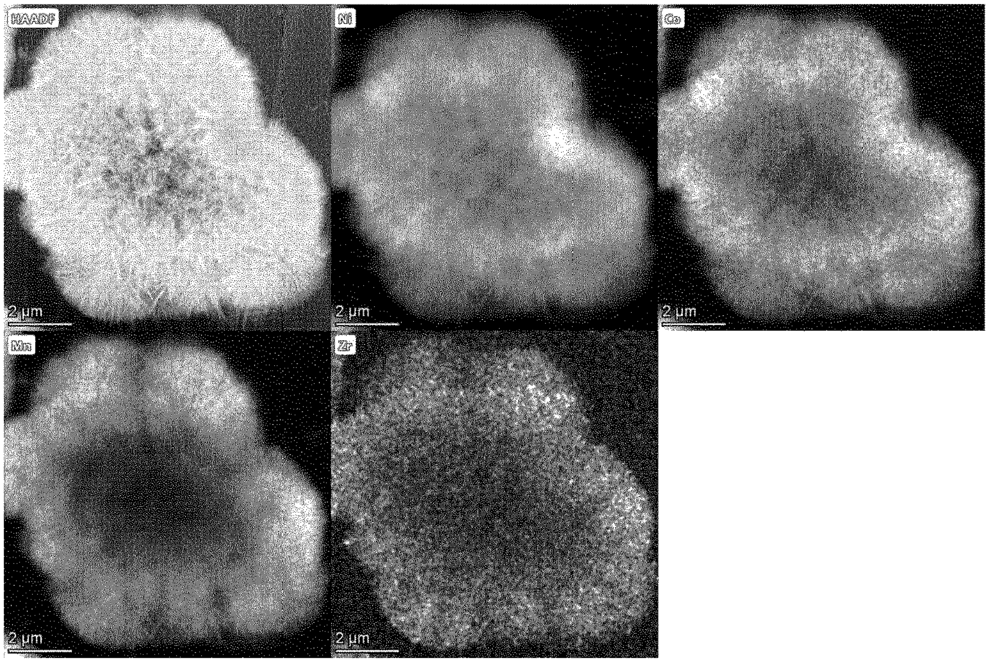

Figure 3: TEM-EDX elemental mapping of inventive precursor pCAM.3
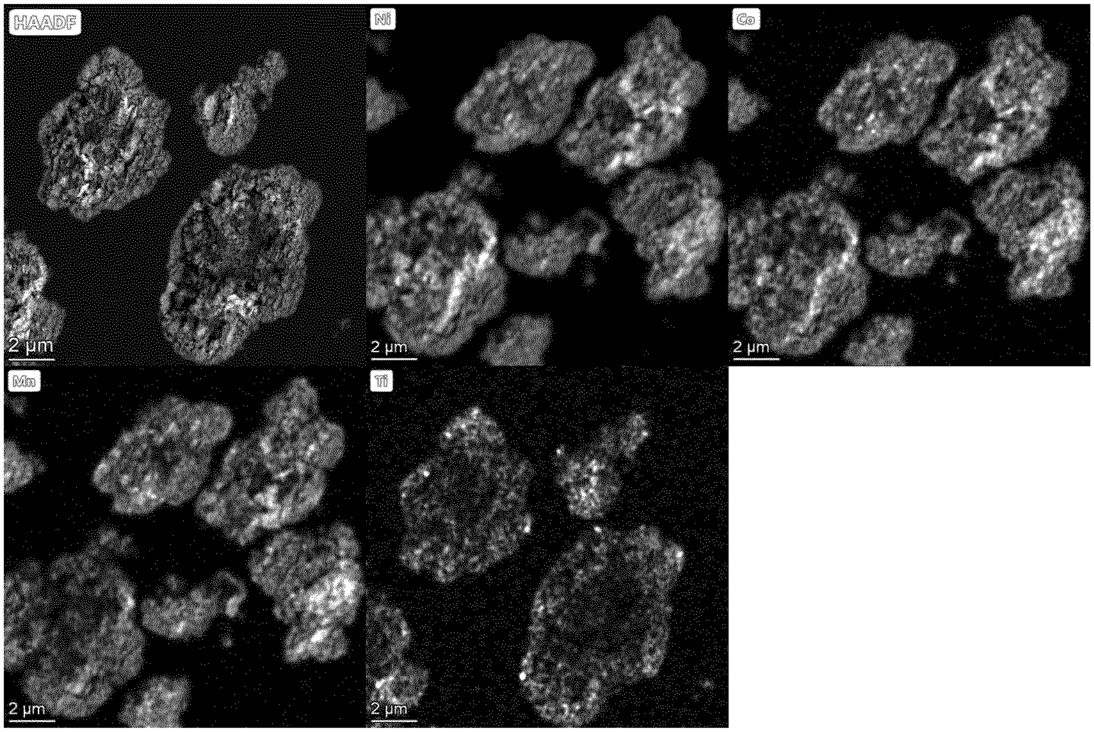
Figure 4: TEM-EDX elemental mapping of inventive precursor pCAM.4
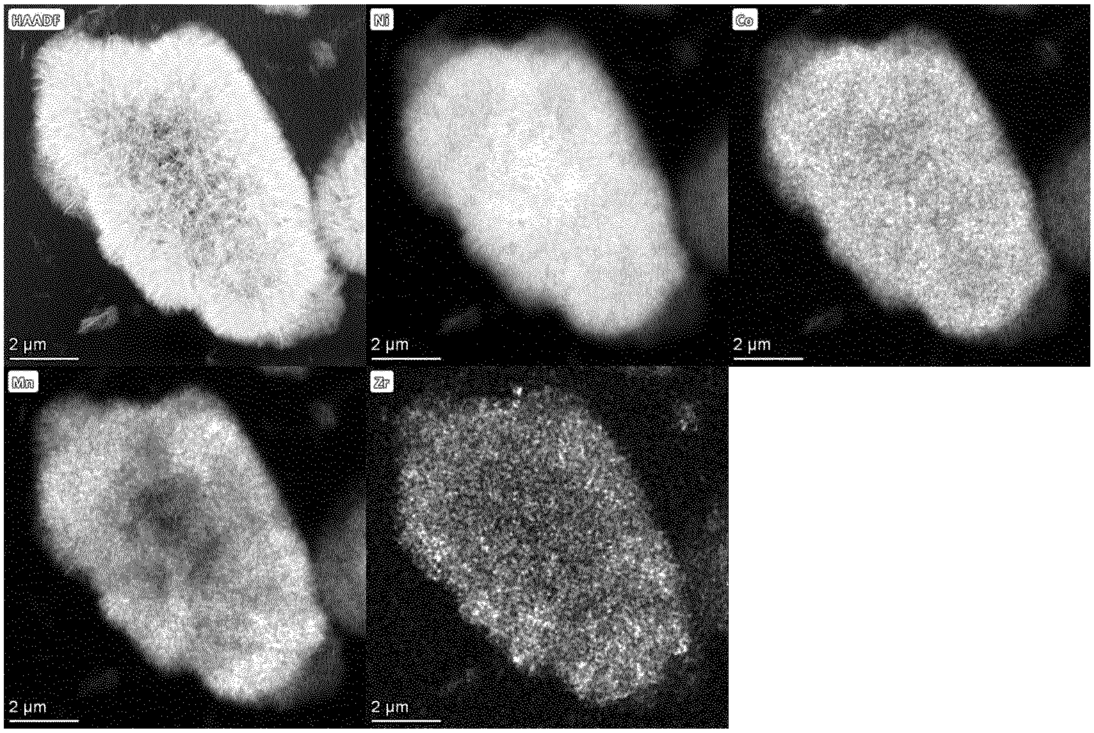

PROCESS FOR MAKING A PARTICULATE (OXY)HYDROXIDE

CROSS-REFERENCE TO RELATED APPLICATIONS

This application is a U.S. National Phase Application of International Patent Application No. PCT/EP2022/050224, filed Jan. 7, 2022, which claims priority to European Patent Application No. 21152621.5, filed Jan. 20, 2021, each of which is hereby incorporated by reference herein.

The present invention is directed towards a process for making a particulate (oxy)hydroxide of TM wherein TM represents metals and TM comprises at least 75 mol-% nickel and wherein said process comprises the steps of:

(a) providing an aqueous solution (α) containing a water-soluble salt of nickel and of one metal selected from cobalt and manganese, and further in the range of from 0.05 to 3.0 mol-% of a compound of at least one metal selected from Ti, Zr, Mg and Nb, and in the range of from 0.05 to 2.0 mol-%, referring to TM, of an α- or β-hydroxy carboxylic acid or ascorbic acid or of an amino acid selected from glycine, alanine and serine, or their alkali metal salts, and an aqueous solution (β) containing an alkali metal hydroxide and, optionally, an aqueous solution (γ) containing ammonia, (b) combining a solution (α) and a solution (β) and, if applicable, a solution (γ) at a pH value in the range of from 11.0 to 13.0 in a stirred tank reactor, thereby creating solid particles of a hydroxide containing nickel, said solid particles being slurried.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobatt oxides, and lithium nickel cobalt manganese oxides. Although extensive research has been performed the solutions found so far still leave room for improvement.

The electrode material is of crucial importance for the properties of a lithium ion battery. Lithium-containing mixed transition metal oxides have gained particular significance, for example spinels and mixed oxides of layered structure, especially lithium-containing mixed oxides of nickel, manganese and cobalt; see, for example, EP 1 189 296. However, not only the stoichiometry of the electrode material is important, but also other properties such as morphology and surface properties.

Corresponding mixed oxides are prepared generally using a two-stage process. In a first stage, a sparingly soluble salt of the transition metal(s) is prepared by precipitating it from a solution, for example a carbonate or a hydroxide. This sparingly soluble salt is in many cases also referred to as a precursor. In a second stage, the precipitated salt of the transition metal(s) is mixed with a lithium compound, for example $Li_2CO_3$, LiOH or $Li_2O$, and calcined at high temperatures, for example at 600 to 1100 °C.

Existing lithium ion batteries still have potential for improvement, especially with regard to the energy density. For this purpose, the cathode active material should have a high specific capacity. This can be achieved, e.g., by an excellent regular shape of the cathode active material particles. Usually, the morphology of the precursor translates into the morphology of the cathode active material unless altered significantly during calcination.

It has been observed that in the course of upscaling, the process of making precursors is very sensitive against changes of pH value. Small pH value changes can have a significant impact on precursor properties, for example the particle diameter.

It was an objective of the present invention to provide a process for making precursors of cathode active materials for lithium ion batteries which have a high volumetric energy density and excellent cycling stability. More particularly, it was therefore an objective of the present invention to provide starting materials for batteries which are suitable for producing lithium ion batteries with a high volumetric energy density and excellent cycling stability. It was a further objective of the present invention to provide a process by which suitable starting materials for lithium ion batteries can be prepared.

Accordingly, the process defined at the outset has been found, hereinafter also referred to as inventive process or process according to the (present) invention. The inventive process may be carried out as a batch process or as a continuous or semi-continuous process. Preferred are continuous processes.

The inventive process comprises at least two steps, hereinafter also referred to as step (a) and step (b), and it may comprise sub-steps. The inventive process will be described in more detail below.

Without wishing to be bound by any theory, we assume that the above properties are improved if a dopant selected from Ti, Zr, Mg or Nb and combinations of at least two of the aforementioned is evenly distributed in the electrode active material particles, and such even distribution is facilitated if the respective dopant(s) is/are already evenly distributed in the precursor particles.

The inventive process is a process for the manufacture of a particulate (oxy)hydroxide of TM wherein TM represents metals and TM comprises at least 75 mol-% nickel and wherein said process comprises the steps of (a) providing an aqueous solution (α) containing a water-soluble salt of nickel and of one metal selected from cobalt and manganese, and further in the range of from 0.05 to 3.0 mol-% of a compound of at least one metal selected from Ti, Zr, Mg and Nb, and in the range of from 0.05 to 2.0 mol-%, referring to TM, of an α- or β-hydroxy carboxylic acid or ascorbic acid or of an amino acid selected from glycine, alanine and serine, or their alkali metal salts, and an aqueous solution (β) containing an alkali metal hydroxide and, optionally, an aqueous solution (γ) containing ammonia, (b) combining a solution (α) and a solution (β) and, if applicable, a solution (γ) at a pH value in the range of from 11.0 to 13.0 in a stirred tank reactor, thereby creating solid particles of a hydroxide containing nickel, said solid particles being slurried.

In one embodiment of the present invention, said precursor is formed from particles with an average particle diameter (D50) in the range of from 2 to 20 μm, preferably 3 to 16 μm, more preferably 5 to 12 μm, determined by LASER diffraction.

In one embodiment of the present invention, inventive precursors have a particle size distribution [(D90)−(D10)] divided by (D50) is in the range of from 0.35 to 2, preferably from 0.35 to 0.5 or from 0.8 to 1.4.

In one embodiment of the present invention, TM is a combination of metals according to general formula (I)

$(Ni_aCo_bMn_c)_{1-d}M_d$ (I)

a being in the range of from 0.80 to 0.99, preferably from 0.87 to 0.95, b being zero or in the range of from 0.01 to 0.12, preferably from 0.03 to 0.08, c being in the range of from zero to 0.12, preferably from 0.03 to 0.08, and d being in the range of from 0.0025 to 0.05, M is at least one of Ti and Zr, and a+b+c=1, and b+c>zero.

The inventive process is a process for manufacture of a particulate (oxy)hydroxide of TM. In the context of the present invention, "(oxy)hydroxides" refer to hydroxides and do not only include stoichiometrically pure hydroxides but especially also compounds which, as well as transition metal cations and hydroxide ions, also have anions other than hydroxide ions, for example oxide ions and carbonate ions, or anions stemming from the transition metal starting material, for example acetate or nitrate and especially sulfate. Oxide ions may stem from a partial oxidation, for example oxygen uptake during drying. Carbonate may stem from the use of technical grade alkali metal hydroxide.

In addition, sulfate may also be present as an impurity in embodiments in which a sulfate was used as starting material, for example in a percentage of 0.001 to 1 mole-%, preferably 0.01 to 0.5 mole-%. Such sulfate will be neglected in the context of the present invention.

In one embodiment of the present invention, the precipitated (oxy)hydroxide of TM has the formula $TMO_x(OH)_y(CO_3)_t$ with $0\leq x<1$, $1<y\leq 2.2$, and $0\leq t\leq 0.3$, preferably $0.005\leq t\leq 0.05$.

Certain elements are ubiquitous. For example, sodium, copper and chloride are detectable in certain very small proportions in virtually all inorganic materials. In the context of the present invention, proportions of less than 0.02 mole % of cations or anions are disregarded. Any mixed hydroxide obtained according to the inventive process which comprises less than 0.02 mole % of sodium is thus considered to be sodium-free in the context of the present invention.

The inventive process is carried out in a stirred tank reactor and includes carrying out the inventive process in a stirred tank reactor as batch reactor in a continuous stirred tank reactor or in a cascade of at least two continuous stirred tank reactors, for example in a cascade of 2 to 4 continuous stirred tank reactors. It is preferred to carry out the inventive process in a continuous stirred tank reactor. Continuous stirred tank reactors contain at least one overflow system that allows to continuously—or within intervals—withdraw slurry—or mother liquor—from said continuous stirred tank reactor.

In embodiments wherein the stirred vessel is a continuous stirred tank reactor or a cascade of at least two stirred tank reactors, the respective stirred tank reactor(s) have an overflow system. Slurry containing precipitated mixed metal hydroxide of TM and a mother liquor. In the context of the present invention, mother liquor comprises water-soluble salts and optionally further additives present in solution. Examples of possible water-soluble salts include alkali metal salts of the counterions of transition metal, for example sodium acetate, potassium acetate, sodium sulfate, potassium sulfate, sodium nitrate, potassium nitrate, sodium halide, potassium halide, including the corresponding ammonium salts, for example ammonium nitrate, ammonium sulfate and/or ammonium halide. Mother liquor most preferably comprises sodium sulfate and ammonium sulfate and ammonia.

In one embodiment of the present invention, the inventive process is performed in a vessel that is equipped with a clarifier. In a clarifier, mother liquor is separated from precipitated mixed metal hydroxide of TM and the mother liquor is withdrawn.

In step (a), various solutions are provided:

aqueous solution (α) containing a water-soluble salts of Ni, and further containing 0.05 to 3.0 mol-% compound of at least one metal selected from Ti, Zr, Mg and Nb, and in the range of from 0.05 to 2.0 mol-%, referring to TM, of an α- or β-hydroxy carboxylic acid or ascorbic acid or of an amino acid selected from glycine, alanine and serine, or their alkali metal salts, and an aqueous solution (13) containing an alkali metal hydroxide and, optionally, an aqueous solution (γ) containing ammonia. Preferably, the present invention is carried out without the use of a solution (γ).

In step (a), an aqueous solution containing a water-soluble salt of Ni is provided, solution (α). The selection of salts reflects the composition of TM, and the molar content of nickel is at least 75%, referring to TM. Solution (α) additionally contains at least one further metal selected from Ti, Zr, Mg, and Nb, for example as sulfate, as basic sulfate, as nitrate, acetate or nitrate. Preferred are $MgSO_4$, $Mg(NO_3)_2$, $Ti(SO_4)_2$, $TiOSO_4$, $TiO(NO_3)_2$, $Zr(SO_4)_2$, $ZrOSO_4$, $ZrO(NO_3)_2$, $Zr(CH_3COO)_4$, $(NH_4)Nb(C_2O_4)_3$, and $(NH_4)NbO(C_2O_4)_2$.

It is preferred to select the respective compounds of Ti, Zr, Mg or Nb from compounds that are soluble in aqueous medium at a certain pH range, preferably at pH values below 10, for example that they display a solubility at 25 °C of at least 10 g/l, preferably 15 to 250 g/l. The amount is in the range of from 0.05 to 3.0 mol-%, referring to sum of nickel and cobalt and manganese, preferred are 0.25 to 2.0 mol-%.

Solution (α) may further contain at least one salt of manganese or cobalt or aluminum or of combinations of at least two of the aforementioned, for example of cobalt sulfate or manganese sulfate or both.

Solution (α) further contains in the range of from 0.01 to 0.05 mol-%, referring to TM, of α- or β-hydroxy carboxylic acid or ascorbic acid or of an amino acid selected from glycine, alanine and serine, or their alkali metal salts. Examples of α-hydroxy carboxylic acids are lactic acid, for example L-lactic acid or D-lactic acid or mixtures thereof, β-hydroxy propionic acid, malic acid, tartaric acid, tartronic acid (2-hydroxymalonic acid), glycolic acid and citric acid. Examples of alkali metal salts are the potassium salts and especially the sodium salts.

Of the aforementioned acids, lactic acid and ascorbic acid are preferred, with ascorbic acid being more preferred.

Examples of alkali metal salts are sodium and potassium salts. Partially neutralized α- or β-hydroxy carboxylic acid are possible as well, as well as partially neutralized ascorbic acid or partially neutralized glycine, alanine or serine. Preferred are for example the sodium salt of alanine, of glycine and of serine. Without wishing to be bound by any theory, we assume that such amino acid is forming a complex with Zr, Ti, Mg or Nb.

α-Alanine may be provided as L-alanine or racemic alanine or as partially racemized L-alanine. Serine may be provided as L-serine or racemic serine or partially racemized. Glycine is preferred as amino acid.

In one embodiment of the present invention, the molar ratio of metal selected from Zr, Ti, Mg or Nb and organic acid selected from ascorbic acid, amino acid from glycine, alanine and serine or α- or β-hydroxy carboxylic acid is in the range of from 3:1 to 1:3, preferably from 2:1 to 1:1.

Said solution (α) may be manufactured by dissolving water-soluble salt(s) of TM, for example the sulfate(s), in water and to then add amino acid selected from glycine, alanine and serine or their alkali metal salts or ascorbic acid or α- or β-hydroxy carboxylic acid, and compound of Zr, Ti, Mg or Nb in the above quantity. It possible as well to dissolve water-soluble salt(s) of TM, for example the sulfates, in the presence of said α- or β-amino acid or its alkali metal salt in water.

It is preferred, though, to form such solution (α) by combining an aqueous solution of said α- or β-hydroxy carboxylic acid or ascorbic acid or any of the above mentioned amino acids or respective alkali metal salt(s) with an aqueous solution of water-soluble salt(s) of TM, for example immediately before combining the freshly formed solution (α) with solution (β) and, if applicable, solution (γ). Said formation may be carried out as premixing in a Y-nozzle.

The term water-soluble salts of nickel or of metals other than nickel refers to salts that exhibit a solubility in distilled water at 25 °C of 25 g/l or more, the amount of salt being determined under omission of crystal water and of water stemming from aquo complexes. Water-soluble salts of nickel and cobalt may preferably be the respective water-soluble salts of $Ni^{2+}$ and $Co^{2+}$. Examples of water-soluble salts of nickel and cobalt are the sulfates, the nitrates, the acetates and the halides, especially chlorides. Preferred are nitrates and sulfates, of which the sulfates are more preferred.

Solution (α) may have a pH value in the range of from 2 to 5. It is preferred to not add ammonia to solution (α).

In step (a), an aqueous solution of alkali metal hydroxide is provided, hereinafter also referred to as solution (β). An example of alkali metal hydroxides is lithium hydroxide, preferred is potassium hydroxide and a combination of sodium and potassium hydroxide, and even more preferred is sodium hydroxide.

Solution (β) may contain some amount of carbonate, e.g., 0.1 to 2% by weight, referring to the respective amount of alkali metal hydroxide, added deliberately or by aging of the solution or the respective alkali metal hydroxide.

Solution (β) may have a concentration of hydroxide in the range from 0.1 to 12 mol/l, preferably 6 to 10 mol/l.

The pH value of solution (β) is preferably 13 or higher, for example 14.5.

In one embodiment of the present invention, an aqueous solution (γ) is provided. Solution (γ) contains ammonia. Solution (γ) may have a pH value in the range of from 8 to 10 and an ammonia concentration in the range of from 1 to 25 mol/l.

In one embodiment of the present invention, aqueous solution (α) and aqueous solution (β) and, if applicable, aqueous solution (γ) have a temperature in the range of 10 to 75 °C before they are combined in said stirred tank reactor.

In step (b), aqueous solution (α) and aqueous solution (β) and, if applicable, aqueous solution (γ) are combined at a pH value in the range of from 10.0 to 13.0 in a stirred tank reactor, thereby creating solid particles of a hydroxide containing nickel, said solid particles being slurried.

In the course of step (b), aqueous solution (α) and aqueous solution (β) are fed into a reactor. Preferably, aqueous solution (α) and aqueous solution (β) are fed into the reactor in a way that the stoichiometry of the metals of TM on one hand and the hydroxide ions on the other hand are "correct", that means the stoichiometries match the stoichiometry of the respective hydroxide to be precipitated. In another embodiment of the present invention, the stoichiometries are adjusted in a way that an excess of hydroxide is present, for example 1 to 5 mol-% with respect to the hydroxide.

In one embodiment of the present invention, aqueous solutions (α) and (β) and—if applicable, (γ)—are fed into the stirred tank reactor through separate inlets. In one embodiment of the present invention, at least one of the inlets is located directly above the vortex caused by the stirring.

In one embodiment of the present invention, aqueous solutions (α) and (β) and—if applicable, (γ) are introduced into said stirred vessel through two inlets, e.g., two pipes whose outlets are located next to each other, for example in parallel, or through a Y-mixer.

In a preferred embodiment of the present invention, the at least two inlets are designed as a coaxial mixer that comprises two coaxially arranged pipes through aqueous solutions (α) and (β) are introduced into a stirred tank reactor. In one embodiment of the present invention, step (b) is carried out by using two or more coaxially arranged pipes through which aqueous solutions (α) and (β) and—if applicable, (γ) are introduced into said stirred tank reactor. In another embodiment of the present invention, the introduction step is carried out by using exactly one system of coaxially arranged pipes through which aqueous solutions (α) and (β) and—if applicable, (γ) are introduced into said stirred tank reactor.

In a preferred embodiment, aqueous solutions (α) and (β) are fed into the stirred tank reactor through a coaxial nozzle.

In embodiments wherein a cascade of at least 2 continuous stirred tank reactors are used aqueous solutions (α) and (β) and—if applicable, solution (γ)—are fed into the stirred tank reactor that is highest upstream.

The stirred tank reactor(s) used in the present invention comprise a stirrer. Such stirrer may be selected from pitch blade turbines, Rushton turbines, cross-arm stirrers, dissolver blades and propeller stirrers. Stirrers may be operated at rotation speeds that lead to an average energy input in the range from 0.1 to 10 W/l, preferably in the range from 1 to 7 W/l.

In addition, the stirred tank reactor(s) used in the present invention may comprise one or more baffles, for example one to four.

In one embodiment of the present invention, step (b) may be performed at a temperature in the range from 20 to 90 °C, preferably 30 to 80 °C and more preferably 35 to 75 °C. The temperature is determined in the stirred tank reactor.

In one embodiment of the present invention, step (b) has a duration in the range of from 10 minutes to 10 hours. In embodiments where the inventive process is carried out as continuous process the duration refers to the average residence time.

In one embodiment of the present invention, step (b) may be performed at ambient pressure. in other embodiments, step (b) is performed at slightly elevated pressure, for example at 10 to 100 mbar above ambient pressure.

Step (b) can be performed under air, under inert gas atmosphere, for example under noble gas or nitrogen atmosphere, or under reducing gas atmosphere. Examples of reducing gases include, for example, CO and $SO_2$. Preference is given to working under inert gas atmosphere.

In one embodiment of the present invention, the inventive process is performed in a stirred tank reactor that is equipped with a clarifier. In a clarifier, mother liquor is separated from precipitated hydroxide of TM and the mother liquor is withdrawn.

In one embodiment of the present invention, step (b) is performed in two sub-steps (b1) and (b2), and wherein sub-step (b1) is performed at a pH value that is by 0.2 to 2.0 units higher than in sub-step (b2). In other words, the pH value in sub-step (b2) is by 0.2 to 2.0 units lower than in sub-step (b1). The lowering of the pH value may be accomplished, e.g., by adding less ammonia in sub-step (b2) than in sub-step (b1), or by selecting an higher ratio of alkali metal hydroxide to TM in sub-step (b1) compared to sub-step (b2), or by addition of an acid, for example sulfuric acid. However, the pH value in sub-step (b2) is still at least 10.0. Preferably, the duration of step (b2) is longer than the duration of step (b1).

In one embodiment of the present invention, sub-steps (b1) and (b2) are performed in a way that the solids from sub-step (b1) are isolated and used as a solid seed for sub-step (b2). In other embodiments, sub-steps (b1) and (b2) are performed in a way that the slurry obtained from sub-step (b1) is used in situ for sub-step (b2).

In one embodiment of the present invention, sub-steps (b1) and (b2) are performed in a way that α- or β-hydroxy carboxylic acid or ascorbic acid or any of the amino acids mentioned before or a respective alkali metal salt is added in both sub-steps or at least in one sub-step, for example in sub-step (b2). The latter embodiment may be achieved by carrying out sub-step (b1) by combining a solution (α') containing water-soluble salts of TM but neither amino acid nor its respective alkali metal salt with a solution (β) and, optionally, a solution (γ), followed by combining in sub-step (b2) a solution (α) with a solution (β) and, optionally, a solution (γ).

In another embodiment of the present invention, step (b) is performed at a pH value that varies by 0.2 units at most. Thus, the pH value is essentially constant during step (b).

By performing the inventive process, an aqueous slurry is formed. The inventive process is very robust against undesired changes of the pH value. From said aqueous slurry, a particulate mixed hydroxide may be obtained by solid-liquid separation steps, for example filtering, spray-drying, drying under inert gas or air, or the like. If dried under air, a partial oxidation may take place, and a mixed (oxy)hydroxide of TM is obtained.

Precursors obtained according to the inventive process are excellent starting materials for cathode active materials which are suitable for producing batteries with a maximum volumetric energy density.

Another aspect of the present invention relates to precursors, hereinafter also referred to as inventive precursors. Inventive precursors are particulate (oxy)hydroxides of TM in which primary particles are agglomerated to form secondary particles.

In inventive precursor, TM comprises at least 75 mol-% nickel. Inventive precursor has an average particle diameter (D50) in the range of from 2 to 20 μm. TM includes at least one metal selected from Ti, Zr, Mg, and Nb in its highest oxidation state, preferably at least one of Ti and Zr, homogeneously distributed within the secondary particles, and said (oxy)hydroxide contains in the range of from 200 to ppm to 1.0% by weight C as organic carbon, and wherein at least 60 vol.-% of the secondary particles consist of agglomerated primary particles that are essentially radially oriented.

In one embodiment of the present invention, the metal(s) selected from Ti, Mg, Nb and Zr is/are additionally homogeneously distributed within the primary particles.

To quantify the organic carbon, all carbon is typically converted into carbon dioxide by heat treatment under oxygen atmosphere and measuring the $CO_2$ by infrared spectroscopy.

The organic carbon is preferably glycine, alanine or serine or any of its alkali metal salts.

The portion of radially oriented primary particles may be determined, e.g., by SEM (Scanning Electron Microscopy) of a cross-section of at least 5 secondary particles.

"Essentially radially oriented" does not require a perfect radial orientation but includes that in an SEM analysis, a deviation to a perfectly radial orientation is at most 11 degrees, preferably at most 5 degrees.

Furthermore, at least 60% of the secondary particle volume is filled with radially oriented primary particles. Preferably, only a minor inner part, for example at most 40%, preferably at most 20%, of the volume of those particles is filled with non-radially oriented primary particles, for example, in random orientation.

In one embodiment of the present invention, TM is a combination of metals according to general formula (I)

$$(Ni_aCo_bMn_c)_{1-d}M_d \qquad (I)$$

with

- a being in the range of from 0.80 to 0.99, preferably from 0.87 to 0.95,
- b being zero or in the range of from 0.01 to 0.12, preferably from 0.03 to 0.08,
- c being in the range of from zero to 0.12, preferably from 0.03 to 0.08, and
- d being in the range of from 0.0025 to 0.05, M is at least one of Ti and Zr, and a+b+c=1, and b+c>zero.

In one embodiment of the present invention, inventive precursor has a total pore/intrusion volume in the range of from 0.033 to 0.1 ml/g, preferably 0.035 to 0.07 ml/g in the pore size range from 20 to 600 Å, determined by $N_2$ adsorption, determined in accordance with DIN 66134 (1998), when the sample preparation for the $N_2$ adsorption measurement is done by degassing at 120 °C for 60 minutes.

In one embodiment of the present invention, inventive precursors have an average secondary particle diameter D50 in the range of from 2 to 20 μm, preferably 3 to 16 μm and even more preferably 5 to 12 μm.

In one embodiment of the present invention, inventive precursors have a specific surface according to BET (hereinafter also "BET-Surface") in the range of from 2 to 70 $m^2/g$, preferably from 4 to 50 $m^2/g$. The BET-Surface may be determined by nitrogen adsorption after outgassing of the sample at 200 °C for 30 minutes or more and beyond this accordance with DIN ISO 9277:2010.

In one embodiment of the present invention, inventive precursors have a particle size distribution [(D90)−(D10)] divided by (D50) in the range of from 0.35 to 2, preferably from 0.35 to 0.5 or from 0.8 to 1.4.

In one embodiment of the present invention, inventive precursors have a bimodal particle size distribution with the first maximum being in the range from 3 to 7 μm ("the smaller particle") and the second maximum in the range from 11 to 17 μm ("the bigger particles"). Even more preferably, the total volume of the smaller particles is in the range of from 10 to 25% of the total volume of the bigger particles.

In one embodiment of the present invention, the particles of inventive precursor display a structure of multiple concentric circles, for example of at least 10 and preferably up to 200 rings. Such concentric rings may be detected when a cross-section of such particles is analyzed by Scanning Electron Microscopy ("SEM"). The structure may be compared to growth rings in trees, with each of the growth rings having a strength in the range of from 5 to 500 nm.

In one embodiment of the present invention, the particles of inventive precursors have a form factor in the range of from 0.87 to 0.99. The form factor may be calculated from the perimeter and area determined from top view SEM images:Form factor=(4π·area)/(perimeter)$^2$.

Inventive precursors are excellently suited for making cathode active materials with a high energy density. Such cathode active materials may be made by mixing inventive precursor with a source of lithium, e.g., $Li_2O$ or LiOH or $Li_2CO_3$, each water-free or as hydrates, and calcination, for example at a temperature in the range of from 600 to 1000 °C. A further aspect of the present invention is thus the use of inventive precursors for the manufacture of cathode active materials for lithium ion batteries, and another aspect of the present invention is a process for the manufacture of cathode active material for lithium ion batteries—hereinafter also referred to as inventive calcination—wherein said process comprises the steps of mixing an inventive particulate transition metal (oxy)hydroxides with a source of lithium and thermally treating said mixture at a temperature in the range of from 600 to 1000 °C. Preferably, the ratio of inventive precursor and source of lithium in such process is selected that the molar ratio of Li and TM is in the range of from 0.95:1 to 1.2:1, more preferably 0.98 to 1.05.

In one embodiment of the present invention, the inventive precursor is heated to a temperature in the range of from 300 to 750 °C— and thus dehydrated or "pre-calcined"—prior to mixing with a source of lithium. In such embodiments, a pre-calcined particulate transition metal (oxy)hydroxide is mixed with a source of lithium and said mixture is thermally treating at a temperature in the range of from 600 to 1000 °C. Preferably, the ratio of pre-calcined inventive precursor and source of lithium is selected that the molar ratio of Li and TM is in the range of from 0.95:1 to 1.2:1, more preferably 0.98 to 1.05.

Examples of inventive calcinations include heat treatment at a temperature in the range of from 600 to 1000 °C, preferably 650 to 850 °C. The terms "treating thermally" and "heat treatment" are used interchangeably in the context of the present invention.

In one embodiment of the present invention, the mixture obtained for the inventive calcination is heated to 600 to 1000 °C with a heating rate of 0.1 to 10 °C/min.

In one embodiment of the present invention, the temperature is ramped up before reaching the desired temperature of from 600 to 1000 °C, preferably 650 to 800 °C. For example, first the mixture obtained from step (d) is heated to a temperature to 350 to 550 °C and then held constant for a time of 10 min to 4 hours, and then it is raised to 650 °C up to 800 °C and then held at 650 to 800 for 10 minutes to 10 hours.

In one embodiment of the present invention, the inventive calcination is performed in a roller hearth kiln, a pusher kiln or a rotary kiln or a combination of at least two of the foregoing. Rotary kilns have the advantage of a very good homogenization of the material made therein. In roller hearth kilns and in pusher kilns, different reaction conditions with respect to different steps may be set quite easily. In lab scale trials, box-type and tubular furnaces and split tube furnaces are feasible as well.

In one embodiment of the present invention, the inventive calcination is performed in an oxygen-containing atmosphere, for example in a nitrogen-air mixture, in a rare gas-oxygen mixture, in air, in oxygen or in oxygen-enriched air. In a preferred embodiment, the atmosphere in step (d) is selected from air, oxygen and oxygen-enriched air. Oxygen-enriched air may be, for example, a 50:50 by volume mix of air and oxygen. Other options are 1:2 by volume mixtures of air and oxygen, 1:3 by volume mixtures of air and oxygen, 2:1 by volume mixtures of air and oxygen, and 3:1 by volume mixtures of air and oxygen.

In one embodiment of the present invention, the inventive calcination is performed under a stream of gas, for example air, oxygen and oxygen-enriched air. Such stream of gas may be termed a forced gas flow. Such stream of gas may have a specific flow rate in the range of from 0.5 to 15 $m^3$/hkg material according to general formula $Li_{1+x}TM_{1-x}O_2$. The volume is determined under normal conditions: 298 Kelvin and 1 atmosphere. Said stream of gas is useful for removal of gaseous cleavage products such as water and carbon dioxide.

In one embodiment of the present invention, the inventive calcination has a duration in the range of from one hour to 30 hours. Preferred are 10 to 24 hours. The time at a temperature above 600 °C is counted, heating and holding but the cooling time is neglected in this context.

A further aspect of the present invention refers to electrodes comprising at least one particulate cathode active material according to the present invention. They are particularly useful for lithium ion batteries. Lithium ion batteries comprising at least one electrode according to the present invention exhibit a good cycling behavior/stability. Electrodes comprising at least one particulate cathode active material according to the present invention are hereinafter also referred to as inventive cathodes or cathodes according to the present invention.

Specifically, inventive cathodes contain (1) at least one inventive particulate cathode active material, (2) carbon in electrically conductive form, (3) a binder material, also referred to as binders or as binders (3), and, preferably, (4) a current collector.

In a preferred embodiment, inventive cathodes contain (1) 80 to 98% by weight inventive particulate cathode active material, (2) 1 to 17% by weight of carbon, (3) 1 to 15% by weight of binder, percentages referring to the sum of (1), (2) and (3).

Cathodes according to the present invention can comprise further components. They can comprise a current collector, such as, but not limited to, an aluminum foil. They can further comprise conductive carbon and a binder.

Cathodes according to the present invention contain carbon in electrically conductive modification, in brief also referred to as carbon (2). Carbon (2) can be selected from soot, active carbon, carbon nanotubes, graphene, and graphite, and from combinations of at least two of the foregoing.

Suitable binders (3) are preferably selected from organic (co)polymers. Suitable (co)polymers, i.e. homopolymers or copolymers, can be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol-% of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol-% of copolymerized propylene and up to 50 mol-% of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (3) is polybutadiene.

Other suitable binders (3) are selected from polyethylene oxide (PEO), cellulose, carboxymethylcellulose, polyimides and polyvinyl alcohol.

In one embodiment of the present invention, binder (3) is selected from those (co)polymers which have an average molecular weight $M_w$ in the range from 50,000 to 1,000,000 g/mol, preferably to 500,000 g/mol.

Binder (3) may be cross-linked or non-cross-linked (co) polymers.

In a particularly preferred embodiment of the present invention, binder (3) is selected from halogenated (co) polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (3) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to inventive cathode active material. In other embodiments, inventive cathodes may comprise 0.1 up to less than 1% by weight of binder(s).

A further aspect of the present invention is a battery, containing at least one cathode comprising inventive cathode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon or tin. Said anode may additionally contain a current collector, for example a metal foil such as a copper foil.

Said electrolyte may comprise at least one non-aqueous solvent, at least one electrolyte salt and, optionally, additives.

Non-aqueous solvents for electrolytes can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol-% of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5,000,000 g/mol, preferably up to 2,000,000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds according to the general formulae (II) and (III)

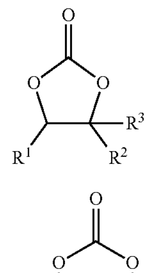

(II)

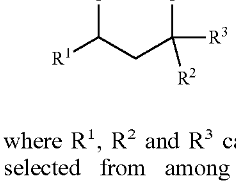

(III)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

(IV)

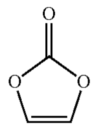

The solvent or solvents is/are preferably used in the water-free state, i.e. with a water content in the range from 1 ppm to 0.1% by weight, which can be determined, for example, by Karl-Fischer titration.

Electrolytes further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(CnF_{2n+1}SO_2)_3$, lithium imides such as $LiN(CnF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(CnF_{2n+1}SO_2)_tYLi$, where m is defined as follows:

t=1, when Y is selected from among oxygen and sulfur, t=2, when Y is selected from among nitrogen and phosphorus, and t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from to 500 nm.

In another embodiment of the present invention, separators can be selected from among PET nonwovens filled with inorganic particles. Such separators can have porosities in the range from to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good cycling stability and a low capacity fading.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by the following working examples.

General Remarks:

Average particle diameters (D50) were determined by dynamic light scattering ("DLS"). Percentages are % by weight unless specifically noted otherwise.

TEM Analysis:

The sample material was embedded in Epofix resin (Struers, Copenhagen, Denmark). Ultra-thin samples (~100 nm) for Transmission Electron Microscopy (TEM) were prepared by ultramicrotomy and transferred to TEM sample carrier grids. The samples were imaged by TEM using Tecnai Osiris and Themis Z3.1 machines (Thermo-Fisher, Waltham, USA) operated at 200/300 keV under HAADF-STEM conditions. Chemical composition maps were acquired by energy-dispersive x-ray spectroscopy (EDXS) using a SuperX G2 detector. Images and elemental maps were evaluated using the Velox (Thermo-Fisher) as well as the Esprit (Bruker, Billerica, USA) software packages.

Ultramicrotomy usually does not create cross-sections through the primary particles but slices the secondary particles along the grain boundaries of the primary particles. EDS determines the chemical composition integrated over the whole thickness of the sample. Signal of the coating elements in the inner region of the primary crystallites is due to the surface coating on top and below the particle.

The co-precipitation reactions were performed in a 250-ml stirred tank reactor (Reactor 1) equipped with an overflow system and three dosing inlets as well as a pH value regulation circuit. pH values refer to pH values determined at 23 °C.

To quantify the amount of (organic) carbon, 100 mg of material were filled into a single-use ceramic cup. Around 0.5 g of iron granulate were added to the sample and the mixture was covered with a layer of around 1.5 g of tungsten granulate. The sample was heated in a flow of pure oxygen in the induction furnace of an Eltra CS 800 analyzer and the carbon of the sample was converted into carbon dioxide, which was quantified in the combustion gases by infrared spectrometry.

I. Manufacture of Precursors

I.1 Manufacture of a Comparative Precursor, C-pCAM.1

Step (a.1): The following aqueous solutions were provided:

Aqueous solution C-(α.1) contained the sulfates of nickel, cobalt and manganese in a total concentration of 1.65 mol/kg solution, with a molar ratio of Ni:Co:Mn=80:10:10, and additionally $ZrO(NO_3)_2$ with a molar ratio of Zr:sum of nickel, cobalt and manganese=0.034:1.

Aqueous solution (β.1): a 25 wt % solution of NaOH in water

Aqueous solution (γ.1): a 25 wt % solution of $NH_3$ in water

Step C-(b.1):

Reactor 1 was charged with 200 ml of deionized water and heated to 55 °C at a constant nitrogen overflow. The pH value was adjusted to 12.1 with solution (β.1). Then, simultaneous addition of aqueous solutions C-(α.1), (β.1) and (γ.1) was commenced. The flow rate of solution (γ.1) was adjusted to meet a $NH_3$/TM ratio of 0.25. The flow rate of solution (β.1) was adjusted to keep the pH value Reactor 1 at a constant value of 12.10. Reactor 1 was operated continuously keeping the liquid level in the vessel constant. A mixed hydroxide of Ni, Co, Mn and Zr was collected via free overflow from the vessel, washed with water, sieved and dried at 120 °C in air for 12 hours to obtain the comparative precursor C-pCAM.1. C-pCAM.1 had an average particle diameter (D50) of 10.4 μm. FIG. 1 shows the inhomogeneous distribution of the dopant Zr. The content of organic carbon was below detection level.

I.2 Manufacture of an Inventive Precursor, pCAM.2

Step (a.2): The following aqueous solutions were provided:

Aqueous solution (α.2) contained the sulfates of nickel, cobalt and manganese in a total concentration of 1.65 mol/kg solution, with a molar ratio of Ni:Co:Mn=80:10:10, and additionally $Zr(CH_3COO)_4$ with a molar ratio of Zr:sum of nickel, cobalt and manganese=0.004:1, and L-lactic acid, the molar ratio lactic acid:Zr was 2:1.

Aqueous solution (β.1): a 25 wt % solution of NaOH in water

Aqueous solution (γ.1): a 25 wt % solution of $NH_3$ in water

Step (b.2):

Reactor 1 was charged with 200 ml of deionized water and heated to 55 °C at a constant nitrogen overflow. The pH value was adjusted to 12.04 with solution (β.1). Then, simultaneous addition of aqueous solutions (α.2), (β.1) and (γ.1) was commenced. The flow rate of solution (γ.1) was adjusted to meet a $NH_3$/TM ratio of 0.25. The flow rate of solution (β.1) was adjusted to keep the pH value Reactor 1 at a constant value of 12.04. Reactor 1 was operated continuously keeping the liquid level in the vessel constant. A mixed hydroxide of Ni, Co, Mn and Zr was collected via free overflow from the vessel, washed with water, sieved and dried under air at 120 °C for 12 hours to obtain the inventive precursor pCAM.2. pCAM.2 had an average particle diameter (D50) of 10.2 μm. The TEM/EDX diagrams in FIG. 2 show the homogeneous distribution of the dopant Zr. The content of organic carbon was 0.33% by weight.

I.3 Manufacture of an Inventive Precursor, pCAM.3

Step (a.3): The following aqueous solutions were provided:

Aqueous solution (α.3) contained the sulfates of nickel, cobalt and manganese in a total concentration of 1.65 mol/kg solution, with a molar ratio of Ni:Co:Mn=80:10:10, and additionally $TiOSO_4$ with a molar ratio of Ti:sum of nickel, cobalt and manganese=0.004:1, and ascorbic acid, the molar ratio ascorbic acid:Ti was 1:1.

Aqueous solution (β.1): a 25 wt % solution of NaOH in water

Aqueous solution (γ.1): a 25 wt % solution of $NH_3$ in water

Step (b.3):

Reactor 1 was charged with 200 ml of deionized water and heated to 55 °C at a constant nitrogen overflow. The pH value was adjusted to 11.73 with solution (β.1). Then, simultaneous addition of aqueous solutions (α.3), (β.1) and (γ.1) was commenced. The flow rate of solution (γ.1) was adjusted to meet a $NH_3$/TM ratio of 0.25. The flow rate of solution (β.1) was adjusted to keep the pH value Reactor 1 at a constant value of 11.73. Reactor 1 was operated continuously keeping the liquid level in the vessel constant. A mixed hydroxide of Ni, Co, Mn and Ti was collected via free overflow from the vessel, washed with water, sieved and dried under air at 120 °C for 12 hours to obtain the inventive precursor pCAM.3. pCAM.3 had an average particle diameter (D50) of 7.9 μm. The TEM/EDX diagrams in FIG. 3 show the homogeneous distribution of the dopant Ti. The content of organic carbon was 0.54% by weight.

I.4 Manufacture of an Inventive Precursor, pCAM.4

Step (a.4): The following aqueous solutions were provided:

Aqueous solution (α.4) contained the sulfates of nickel, cobalt and manganese in a total concentration of 1.65 mol/kg solution, with a molar ratio of Ni:Co:Mn=80:10:10, and additionally $Zr(CH_3COO)_4$ with a molar ratio of Zr:sum of nickel, cobalt and manganese=0.004:1, and ascorbic acid, the molar ratio ascorbic acid:Zr was 1:1.

Aqueous solution (β.1): a 25 wt % solution of NaOH in water

Aqueous solution (γ.1): a 25 wt % solution of $NH_3$ in water

Step (b.4):

Reactor 1 was charged with 200 ml of deionized water and heated to 55 °C at a constant nitrogen overflow. The pH value was adjusted to 11.72 with solution (β.1). Then, simultaneous addition of aqueous solutions (α.4), (β.1) and (γ.1) was commenced. The flow rate of solution (γ.1) was adjusted to meet a $NH_3$/TM ratio of 0.25. The flow rate of solution (β.1) was adjusted to keep the pH value Reactor 1 at a constant value of 11.72. Reactor 1 was operated continuously keeping the liquid level in the vessel constant. A mixed hydroxide of Ni, Co, Mn and Zr was collected via free overflow from the vessel, washed with water, sieved and dried under air at 120 °C for 12 hours to obtain the inventive precursor pCAM.3. pCAM.3 had an average particle diameter (D50) of 9.7 μm. The TEM/EDX diagrams in FIG. 4 show the homogeneous distribution of the dopant Zr. The content of organic carbon was 0.60% by weight.

II. Manufacture of Cathode Active Materials

General Protocol:

The respective dehydrated precursor were first thermally treated at about 300 °C under oxygen atmosphere for 5 hours and then, after cooling down to room temperature, mixed with LiOH—$H_2O$ in a molar ratio of Li:TM of 1.01:1. The resultant mixture was poured into an alumina crucible and heated to 350 °C for 4 hours and then to 750 °C for 6 hours under oxygen atmosphere (10 exchanges/h) with a heating rate of 3 °C/min. The resultant material was cooled to ambient temperature at a cooling rate of 10 °C/min and subsequently sieved using a mesh size of 30 μm to obtain comparative material C-CAM.1 from p-C-CAM.1 and the inventive cathode active materials CAM.2, CAM.3, CAM.4 from p-CAM.2, p-CAM.3, p-CAM.4, respectively.

The invention claimed is:

1. Particulate A particulate (oxy)hydroxide of TM wherein TM comprises nickel and at least one component selected from the group consisting of cobalt and manganese, wherein at least 75 mol-% of TM is nickel, and wherein said (oxy)hydroxide has an average particle diameter (D50) in the range of from 3 to 20 μm, wherein TM contains at least one further metal selected from the group consisting of Ti, Zr, Mg and Nb being in its respective highest oxidation state and homogeneously distributed within secondary particles, and wherein said (oxy)hydroxide contains in the range of from 200 ppm to 1.0% by weight C as organic carbon, and wherein at least 60 vol.-% of the secondary particles consist of agglomerated primary particles that are radially oriented within a deviation of at most 11 degrees.

2. The particulate (oxy)hydroxide according to claim 1 wherein the metal(s) selected from the group consisting of Ti, Mg, Nb and Zr is/are additionally homogeneously distributed within the primary particles.

3. The particulate (oxy)hydroxide of TM according to claim 1 wherein TM is a combination of metals according to general formula (I)

$$(Ni_aCo_bMn_c)_{1-d}M_d \quad (I)$$

with a being in the range of from 0.80 to 0.99, b being zero or in the range of from 0.01 to 0.12, c being in the range of from zero to 0.12, and d being in the range of from 0.0025 to 0.03, M is at least one of Ti and Zr, and $$a+b+c=1.$$

4. The particulate (oxy)hydroxide according to claim 1 having a form factor in the range of from 0.97 to 0.99.

5. The particulate (oxy) hydroxide according to claim 1, wherein at least 60 vol.-% of the secondary particles consist of agglomerated primary particles that are radially oriented within a deviation of at most 5 degrees.

6. The particulate (oxy) hydroxide according to claim 1, wherein at least 60 vol.-% of the secondary particles consist of agglomerated primary particles that are radially oriented.

7. A method of using the particulate (oxy)hydroxides according to claim 1, the method comprising using the particulate (oxy)hydroxides for the manufacture of cathode active materials for lithium ion batteries.

8. A process for making the particulate (oxy)hydroxide of TM oc laim 1, wherein said process comprises the steps of:

(a) providing an aqueous solution (α) containing a water-soluble salt of nickel and of one metal selected from the group consisting of cobalt and manganese, and further in the range of from 0.05 to 3.0 mol-% of a compound of at least one metal selected from the group consisting of Ti, Zr, Mg and Nb, and in the range of from 0.05 to 2.0 mol-%, referring to TM, of an α- or β-hydroxy carboxylic acid or ascorbic acid or of an amino acid selected from the group consisting of glycine, alanine and serine, or their alkali metal salts, and an aqueous solution (β) containing an alkali metal hydroxide and, optionally, an aqueous solution (γ) containing ammonia, (b) combining the solution (α) and a solution (β) and, if applicable, the solution (γ) at a pH value in the range of from 11.0 to 13.0 in a stirred tank reactor, thereby creating solid particles of a hydroxide containing nickel, said solid particles being slurried.

9. The process according to claim 8 wherein TM is a combination of metals according to general formula (I)

$$(Ni_aCo_bMn_c)_{1-d}M_d \quad (I)$$

with a being in the range of from 0.80 to 0.99, b being zero or in the range of from 0.01 to 0.12, c being in the range of from zero to 0.12, and d being in the range of from 0.0025 to 0.05, M is at least one of Ti and Zr, and a+b+c=1, and b+c>zero.

10. The process according to claim 8 wherein said amino acid is glycine.

11. The process according to claim 8 wherein solution (α) contains ascorbic acid.

12. The process according to claim 8 wherein solution (α) contains lactic acid.

13. The process according to claim 8 wherein solution (α) contains in total 0.25 to 2 mol-% of a metal selected from the group consisting of Ti, Zr, Mg and Nb, referring to the sum of nickel and cobalt and manganese.

14. The process according to claim 8 wherein solutions (α) and (β) are fed into the vessel through a coaxial nozzle.

15. The process according to claim 8 wherein step (b) is performed at a pH value that varies by 0.2 units at most.

* * * * *